H. A. HANNUM.
MILK-COOLER.
No. 182,436. Patented Sept. 19, 1876.
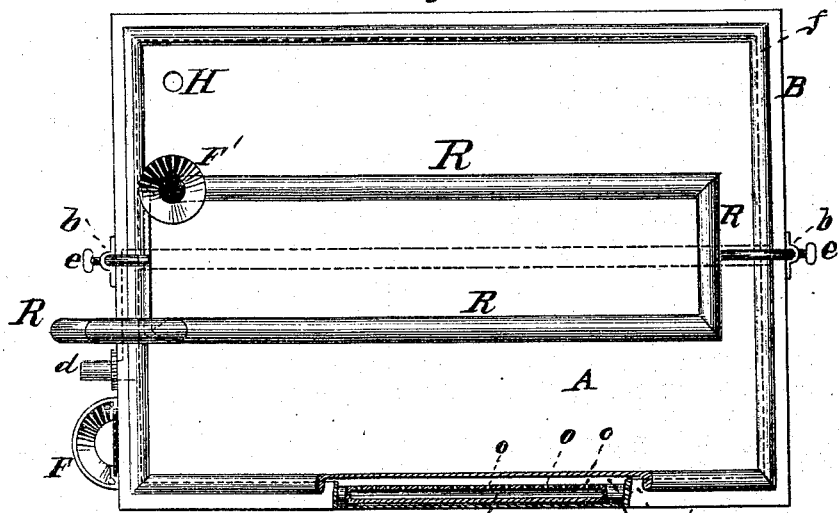
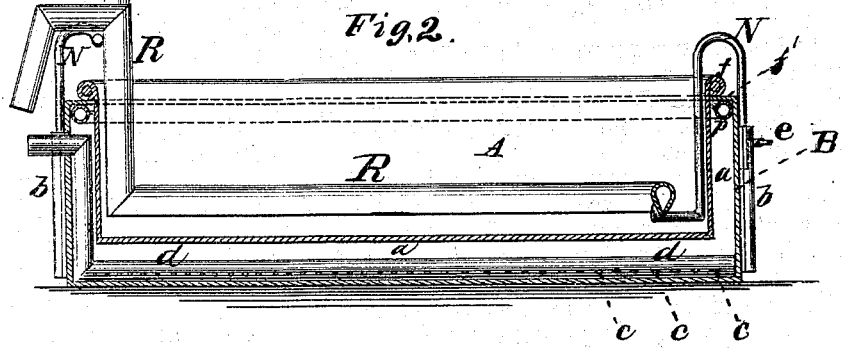
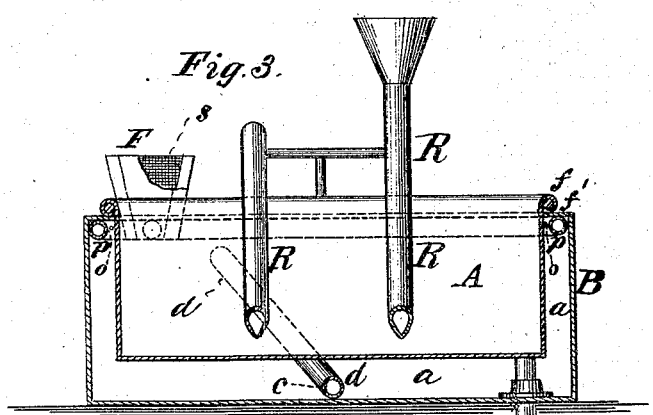
Witnesses:
John Becker
Fred Hayns
H. A. Hannum
by his Attorneys
Brown & Allen

UNITED STATES PATENT OFFICE.

HENRY A. HANNUM, OF CAZENOVIA, NEW YORK.

IMPROVEMENT IN MILK-COOLERS.

Specification forming part of Letters Patent No. 182,436, dated September 19, 1876; application filed July 27, 1876.

*To all whom it may concern:*

Be it known that I, HENRY A. HANNUM, of Cazenovia, in the county of Madison and State of New York, have invented an Improved Milk-Cooler; and I do hereby declare that the following is a full, clear, and exact description of the same, reference being had to the accompanying drawing, which forms part of this specification.

The main object of my invention is to apply the cooling first to the top of the stratum of milk to be cooled. The warmer milk rising to the top, the cooling will thus advance more rapidly, and a slow gentle circulation of the particles of milk will be maintained till the cooling is finished, this circulation greatly facilitating the rising of cream to the surface of the milk.

The invention consists in novel means for applying the cooling first to the top of the milk, and of obtaining a thorough and uniform circulation of the cooling-water through all parts of the tank.

Figure 1, in the accompanying drawing, is a top view of my improved milk-cooler, a portion being broken away. Fig. 2 is a vertical longitudinal section of the same; and Fig. 3 is a vertical cross-section.

A is the milk-pan, which is surrounded by a tank, B, the pan being flanged at its upper border, as shown at $f$, and said flange $f$ resting upon a flange, $f'$, formed on the inner side of the upper border of the tank B in such manner as to support the said pan within said tank, and to leave a space, $a$, all around the said pan, and underneath the bottom thereof, through which water for cooling the contents of the reservoir is caused to circulate, as hereinafter more fully set forth.

Directly underneath the flange $f'$, attached to the tank B, and entirely surrounding the top of the pan A, is a perforated pipe, $p$. The cooling-water is passed into this pipe through the funnel F, Figs. 1 and 3, in which funnel may be placed a strainer, $s$, to prevent impurities from entering the said pipe $p$, and obstructing the flow of water through the perforations $o$. The said pipe $p$, instead of being perforated at short intervals, as shown, may have slits or a continuous longitudinal opening, such slits, or perforations, or openings being, preferably, though not necessarily, on the side of the pipe nearest the pan. The water issuing through the perforations $o$, Fig. 1, of the pipe $p$, is thrown directly against the upper part of the vertical sides of said milk-pan in its natural course of circulation, as hereinafter described, descending along the said sides of the reservoir, first cooling the upper part of the contents of the pan. Along the bottom of the space $a$ extends a pipe, $d$, perforated on the under side at intervals throughout, as shown at $c$, Fig. 2, or provided with one or more longitudinal slits, extending its whole length. At one end the said pipe rises obliquely along the inner side of the end of the tank B, and passes out through the same near the top, as shown in Figs. 1 and 3. The cooling-water filling the space $a$ enters into the pipe $d$ through the perforations $c$, rises in the obliquely-ascending part of said pipe, and escapes at the outer end thereof, $d$, Fig. 1. The circulation of the cooling-water is therefore downward along the walls of the pan to the bottom of the space $a$, thence into the pipe $d$, thence upward through the obliquely-ascending part of said pipe $d$, at the outer end of which it passes off. By this method of bringing the water into the tank or space $a$, through the openings in the pipe or conduit which extend all round the tank, and of taking away the water, after it becomes warmed, through the openings provided along the entire length of the discharge-pipe $d$, there is a thorough and uniform circulation obtained in all parts of the space between the pan and the tank, and all dead water in the corners and other parts of the tank is entirely avoided.

In the bottom of the tank B is an opening, H, through suitable packing in which passes the tube T, attached to the pan A, from which the milk may be drawn out of said pan, the said tube being provided with a suitable stopper. When the pan A is removed from the tank B, the water may also be drawn from the said tank through the opening H.

When the pan A is large, and employed for cooling a large quantity of milk, an adjustable pipe, R, placed in the milk-pan, is employed.

The lower parts of the horizontal portions of this pipe are made of V-shaped or angular cross-section, having the angle at the bottom, as shown in Figs. 2 and 3. This form of pipe will not obstruct the rising of the cream, whereas pipes with circular cross-section do obstruct the rising of the cream which gathers upon them, and is retained.

The pipe R may cross and recross the space in the milk-pan as many times as necessary, bending at the ends of said reservoir, preferably, at right angles, as shown in Fig. 1. On one end of said pipe, which rises vertically to some distance above the pan A, is a funnel, F', Figs. 1 and 2, and the other end, which also rises vertically, bends over the upper edge of said pan, and downward on the outside of the tank B. Curved supports N, passing over the edge of said pan and tank, are attached to the pipe R, the outer ends of said supports passing downward into sockets b, Figs. 1 and 2. Set-screws e, passing through the sides of the sockets s, serve to hold the supports and the pipe R at any desired elevation. The pipe R may by these means be suspended in the milk, to aid in cooling, a circulation of cold water through said pipe being maintained by allowing a stream of water to run into the funnel F'. The perforations in the pipes p and d distribute the water, and render its cooling action throughout the apparatus uniform.

I claim—

The milk-pan, within the surrounding tank B, in combination with the perforated pipe d at the bottom of the tank, having a bent end, and the perforated pipe p, between the milk-pan and the tank, at the upper edges of the same, for the purpose of throwing the water against the upper part of the sides of the pan, as and for the purpose described.

HENRY A. HANNUM.

Witnesses:
H. H. COLTON,
H. BLACK.